United States Patent
Ohashi et al.

(10) Patent No.: US 6,261,708 B1
(45) Date of Patent: Jul. 17, 2001

(54) JOINED BODY OF ALUMINUM NITRIDE SERIES CERAMICS, METHOD OF JOINING ALUMINUM NITRIDE SERIES CERAMICS AND JOINING AGENT

(75) Inventors: Tsuneaki Ohashi, Ogaki; Tsutomu Imai, Ichinomiya, both of (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/013,042

(22) Filed: Jan. 26, 1998

(30) Foreign Application Priority Data

Jan. 30, 1997 (JP) .................................................. 9-029808
Nov. 25, 1997 (JP) .................................................. 9-338295

(51) Int. Cl.[7] .............................. B32B 5/16; B25G 3/34; B32K 1/19
(52) U.S. Cl. ................... 428/698; 148/535; 228/262.51; 403/272; 428/328
(58) Field of Search ..................................... 428/34.4, 698, 428/697, 699, 212; 156/89.11; 427/376.1; 65/36, 42; 264/30, 31, 43, 600, 125, 1.21, 430, 36.18, 297.9; 501/98.4; 106/313

(56) References Cited

U.S. PATENT DOCUMENTS

| | | | |
|---|---|---|---|
| 4,347,089 | * | 8/1982 | Loehman ................................. 156/89 |
| 4,863,658 | * | 9/1989 | Sugiura et al. ........................ 264/65 |
| 5,024,883 | * | 6/1991 | SinghDeo et al. .................... 428/323 |
| 5,051,397 | * | 9/1991 | Sato et al. ............................... 505/1 |
| 5,096,863 | | 3/1992 | Fukushima ............................. 501/98 |
| 5,165,983 | * | 11/1992 | Sugiura et al. ........................ 428/141 |
| 5,529,651 | * | 6/1996 | Yoshida et al. ......................... 156/85 |
| 5,534,091 | * | 7/1996 | Okuda et al. ........................... 156/89 |
| 5,541,145 | * | 7/1996 | Harris et al. ............................. 501/96 |
| 5,721,062 | * | 2/1998 | Kobayashi ............................. 428/688 |

FOREIGN PATENT DOCUMENTS 0 754 661 A1    1/1997   (EP) .

* cited by examiner

Primary Examiner—Hoa T. Le
(74) Attorney, Agent, or Firm—Parkhurst & Wendel, L.L.P.

(57) ABSTRACT

A novel method is provided for joining substrates made of aluminum nitride series ceramics to each other, which can perform the joining substantially without leaving an intervening third phase other than aluminum nitride series ceramics at the joining interface of the substrates. The method is performed, for example, by providing a joining agent 3 containing at least an aluminum nitride series ceramics and a flux between the substrates 1 and 2, heat treating the joining agent to eutectically melt the aluminum nitride series ceramics and the flux, then precipitating a reprecipitated phase of the aluminum nitride series ceramics at the joining interface of the substrates. Alternatively, the method is performed by providing a joining agent 3 containing at least an aluminum nitride series ceramics and a flux between the substrates 1 and 2, heating the joining agent to a temperature range T1 which is higher than the melting point of the flux, subsequently heating the joining agent to a temperature range T2 which is higher than the temperature range T1 to exit the components of the flux from the joining interface, ten precipitating the reprecipitated phase of the aluminum nitride series ceramics at the joining interface.

17 Claims, 4 Drawing Sheets

FIG_1a

FIG_1b

FIG_2a

FIG_2b

JOINED BODY OF ALUMINUM NITRIDE SERIES CERAMICS, METHOD OF JOINING ALUMINUM NITRIDE SERIES CERAMICS AND JOINING AGENT

BACKGROUND OF THE INVENTION

1. Field of the Invention

The present invention relates to a joined body of aluminum nitride series ceramics, a method of joining the aluminum nitride series ceramics, and a joining agent which can satisfactorily be used for the joining.

2. Related Art Statement

In conventional semiconductor-producing apparatuses, such as, etching devices and chemical vapor deposition devices, etc., so-called stainless heaters and indirect heating system heaters have been generally used. However, when such heaters are used as heat sources, they are occasionally corroded by an action of halogen-series corrosive gases to form particles and their heat efficiencies are bad. In order to solve such problems, the applicant disclosed formerly in Japanese Patent Application Laid-Open No. 3-26,131 a ceramic heater having a wire of a high melting point embedded in the interior of a dense ceramic substrate, the wire being spirally wound in the substrate of a disc-shape and connected at the both ends to electric terminals. Such a ceramic heater is found to have superior characteristic properties particularly for producing semiconductors.

It has been considered that silicon nitride, aluminum nitride, Sialon and the like nitride series ceramics are preferable ceramics for constituting the substrate of ceramic heaters. Sometimes, a susceptor is mounted on a ceramics heater, and a semiconductive wafer is mounted and heated on the susceptor. The applicant disclosed formerly in Japanese Patent Application Laid-Open No. 5-101,871 that aluminum nitride is preferable as a substrate for such a susceptor and ceramic heaters, because aluminum nitride has an exceedingly high corrosion-resistant property to $ClF_3$ or the like halogen-series corrosive gases which are frequently used as etching gases and cleaning gases, particularly in semiconductor production apparatuses. In the meantime, because ceramics are hardly processed, studies and researches have been made on joining plural ceramics of a simple shape to each other so as to obtain a part or an element of a complicated shape.

However, generally there is a problem in that at the joining of the interface between the ceramics a third phase is formed having thermal expansion and mechanical properties which are different from those of the ceramics. This third phase is easily fractured by thermal stress due to heating and cooling and various mechanical stresses. Particularly, aluminum nitride series ceramics have low tenacities as compared with silicon nitride ceramics, etc., so that it is largely influenced by the third phase.

Also, when aluminum nitride series ceramics were joined to each other by a glass or a compound consisting mainly of silicon, the third phase remaining at the joining interface is selectively corroded by a plasma of $NF_3$, $ClF_3$ or the like halogen series corrosive gas. Such a joined body having the corrodable third phase could not withstand the use in the corrosive environment of semiconductor production apparatuses.

In Japanese Patent Application Laid-Open No. 2-124,778 there is described a method of directly joining substrates made of aluminum nitride sintered bodies to each other wherein the substrates are contacted and heated to 1,800–1,900° C. to an integral body through diffusion joining. However, for joining aluminum nitride sintered bodies to each other by such a diffusion joining method, an extremely high temperature is required. For instance, the temperature of 1,800–1,900° C. is a same extent of high temperature as that required for producing the original aluminum nitride sintered bodies. Thus, the substrates in the joining process are liable to deteriorate and deform, and weak joined bodies of low strength of about 60 MPa or less could only be obtained.

In Japanese Patent Application Laid-Open No. 8-73,280 there is disclosed a joined body of a relatively high strength of aluminum nitride sintered bodies. However, in this method also a high temperature is required for the joining as that required for producing the original aluminum nitride sintered bodies. In addition, the method requires an extremely precise working of the substrates surfaces to a roughness and a flatness of 0.2 μm or less, and such a working of course increases the production cost.

SUMMARY OF THE INVENTION

An object of the present invention is to provide a novel method of joining substrates made of aluminum nitride series ceramics to each other, wherein the ceramics can be joined without a substantial presence of an intervening third phase other than aluminum nitride series ceramics phase at the joining interface of the substrates.

Another object of the present invention is to provide a strong joining at a relatively low joining temperature.

Now, the above objects can be achieved by the present invention.

The present invention is a joined body of plural substrates made of aluminum nitride series ceramics, comprising at the joining interface of the substrates a reprecipitated phase of aluminum nitride series ceramics reprecipitated from a liquid phase.

Also, the present invention is a method of producing a joined body of plural substrates made of aluminum nitride series ceramics, comprising providing a joining agent containing at least an aluminum nitride series ceramics and a flux between the substrates, heating the aluminum nitride series ceramics and the flux to melt by eutectic melting, and subsequently precipitating a reprecipitated phase of aluminum nitride series ceramics at the joining interface of the substrates.

Also, the present invention is a method of producing a joined body of plural substrates made of aluminum nitride series ceramics, comprising providing a joining agent containing at least an aluminum nitride series ceramics and a flux between the substrates, heating the joining agent to a temperature range T1 which is not lower than the melting point of the flux, then heating the joining agent to a temperature range T2 which is higher than the temperature range T1 to exit the flux components from the joining interface, and subsequently precipitating a reprecipitated phase of aluminum nitride series ceramics at the joining interface of the substrates.

Also, the present invention is a joining agent for joining plural substrates made of aluminum nitride series ceramics, comprising aluminum nitride series ceramics and a flux containing 25–45 wt % of CaO, 5–30 wt % of $Y_2O_3$ and the rest of $Al_2O_3$, and the aluminum nitride series ceramics in the joining agent having a content of not less than 10 wt % but not more than 90 wt %.

Also, the present invention is a joining agent for joining plural substrates made of aluminum nitride series ceramics, comprising aluminum nitride series ceramics and a flux, the aluminum nitride series ceramics in the joining agent having a content of not less than 10 wt % but not more than 90 wt %, the flux having a composition of X-Y-Z series composition, wherein X is a compound of at least one metal element selected from the group consisting of alkali metal elements and alkaline earth metal elements, Y is a compound of rare earth element, Z is a compound of aluminum, the proportion of the metal element constituting the compound X in the total metal elements constituting the flux is in a range of 25–50 mol%, the proportion of the rare earth element constituting the compound Y in the total metal elements constituting the flux is in a range of 5–30 mol%, and the rest of the total metal elements constituting the flux is aluminum.

BRIEF DESCRIPTION OF THE DRAWINGS

For a better understanding of the present invention, reference is made to the accompanying drawings, in which.

Numbering in the drawings.
1, 2 . . . substrate
1a, 2a . . . joining interface of substrates 1,2
3 . . . joining agent
6 . . . susceptor
8 . . . retaining member
9 . . . inner space of the retaining member 8
10, 11 . . . cable
12 . . . terminal of a resistive heating member
13 . . . terminal of electrode
20 . . . melted joining agent
21 . . . liquefied vicinity of the interface between the substrates 1, 2

DETAILED DESCRIPTION OF THE INVENTION

Hereinafter, the joined body and the joining method of the present invention will be explained in more detail with reference to the drawings.

Into the aluminum nitride series ceramics constituting the substrate various additives, such as, a sintering agent and a coloring matter may be added. As shown diagrammatically in FIG. 1a, the joining interfaces 1a, 2a of the substrates 1, 2 are opposingly disposed. Then, a desired joining agent 3 is interposed between the joining interfaces 1a, 2a of the substrates 1, 2.

Figure 1A:
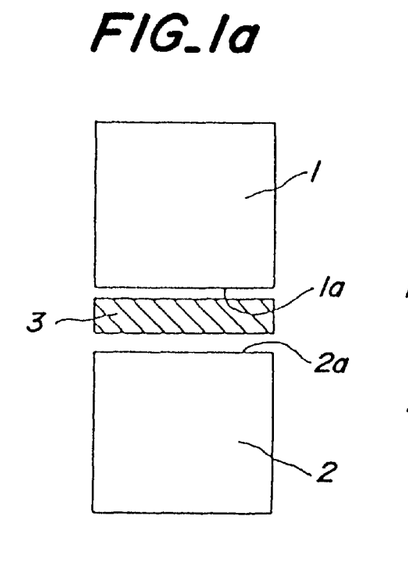
FIG. 1a is a schematic front view of substrates 1, 2 before joining.

At that time, the inventors reached to a consideration to incorporate at least aluminum nitride series ceramics and a flux into the joining agent 3. The flux has to be melted at a lower temperature than the sintering temperature of the substrates 1, 2, and preferably has a melting point of not more than 1,500° C. so as not to incur deterioration of the substrates 1, 2 due to heating in the joining process.

Figure 1B:
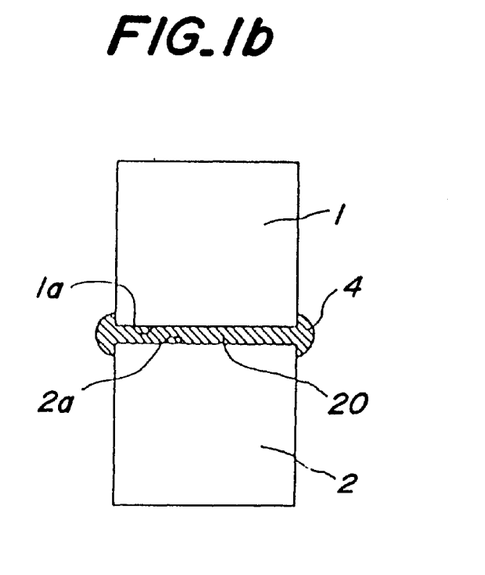
FIG. 1b is a schematic front view of the substrates 1, 2 after the joining agent was melted at the interface between the substrates 1, 2.

The inventors further attempted to heat the substrates 1, 2 together with the joining agent 3 at a temperature higher than the melting point of the flux in the joining agent 3. By this attempt, the joining agent 3 is melted, the surfaces 1a and 2a of the substrates 1, 2 are wettened by the melted joining agent 20, and a portion of the melted joining agent 20 is displaced to the ends of the wettened surfaces 1a and 2a to form expanded portions 4, 4, as shown in FIG. 1b.

Figure 2A:
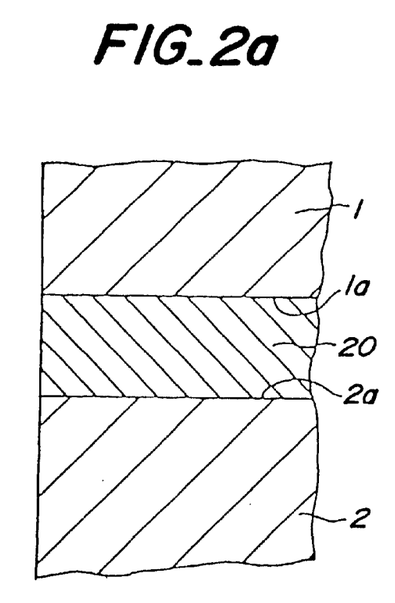
FIG. 2a is a schematic cross-sectional view of the substrates 1, 2 after the joining agent was melted between the substrates 1, 2.

In such a case, at an initial period of melting of the flux, a melt 20 is existent between the surfaces 1a and 2a to be joined as shown in FIG. 2a. However, if the heating is maintained at a temperature range higher than the melting point of the flux, the vicinities 21, 21 of the interface between the substrates 1, 2 adjoining the melted joining agent 20 become a liquefied state. For example, when an oxide of Ca—Al—O eutectic composition or Y—Ca—Al—O eutectic composition is used as a flux, it is considered that the flux begins to melt at around 1,375° C. or 1,415° C., then the surfaces 1a and 2a to be joined contact with the melted flux to start liquefaction thereof.

Moreover, the incorporated aluminumnitride series ceramics in the joining agent is considered to melt into the flux at that time.

The incorporated aluminum nitride series ceramics passes through a sintering process which is a so-called "liquid phase sintering". That is, it passes through a process that the grains of the aluminum nitride series ceramics are once liquefied during the heating step and then solidified during the cooling step.

In case when producing usual members, such as, the substrates 1, 2, a powder of aluminum nitride series ceramics is mixed with organic binders, usually added with not more than 5 wt % of a sintering agent, and heated. At that time, the vicinities of the aluminum nitride series ceramics grain surfaces are melted to displace or mass transfer mainly along the grain surfaces, and the adjoining grains are joined to each other by the displaced melt. As a result, numerous grains are firmly joined to each other to form a structure of the ceramics.

In contrast, when the joining agent 3 is heated to form a melt phase 5 between the substrates 1, 2, it is considered that the aluminum nitride series ceramics grains are liquefied at the vicinity of the interface between the melted joining agent 3 and the substrates 1, 2, and the flux components are diffused into the substrates 1, 2 through the liquefied phase to change the composition of those portions of the substrates being diffused.

However, in the present invention, it is considered that, in addition to the above function, the aggregate aluminum nitride series ceramics grains are substantially melted and disappeared in the melt 5. This is because the amount of the flux is very large in the melt 5 in the present invention.

When the aluminum nitride series ceramics grains are melted in the liquefied phase, protruded portions of surfaces 1a, 2a of the substrates 1, 2 to be joined are preferentially dissolved out in the melted joining agent, thus the surfaces 1a, 2a are made flattened. Thereafter, if they are cooled without performing the next heating step, the components of the joining agent are precipitated at the crystal grain boundaries of the aluminum nitride series ceramics grains.

In the melting step of the flux (the first process), the heating temperature is selected to a temperature higher than the melting point of the flux but preferably lower than an exiting temperature of the flux at which the later-described exit of the joining agent substantially occurs so as to prevent the exit of the flux at this step.

Subsequently, when in the second step the heating temperature is elevated to a higher temperature than the heating temperature in the first step, the melted flux is substantially exited between the substrates 1, 2, so that the substrates are continuously joined to each other without the presence of an intervening third phase, except for any remaining insubstantial amount of flux.

Moreover, the inventors found out leading to accomplishment of the present invention that the aluminum nitride substantially melted in the melted flux is reprecipitated during the cooling process to form a reprecipitated phase and that the substrates 1, 2 are directly and firmly bonded to each other through the reprecipitated phase of aluminum nitride series ceramics reprecipitated from the melted flux without the presence of an intervening third phase other than aluminum nitride phase.

The above mechanism is similar to the mechanism of, when aluminum nitride is solidified from a liquid phase to precipitate aluminum nitride grains, exiting yttrium and the like sintering agent from the grains and further from the interior to the exterior of the sintered body. However, the process of the above mechanism takes place at the vicinity of the aluminum nitride grains as described above.

The present invention can provide a strong joining strength in any case regardless of the kind of aluminum nitride series ceramics constituting the substrates. Moreover, aluminum nitride grains can easily mutually be diffused during the cooling process of the melted flux, so that the joining can be realized at a lower temperature than the temperature of joining the aluminum nitride series ceramics of solid phases.

The present invention is particularly suited to the aluminum nitride series ceramics of a relative density of 95% or more. The present invention is also suited well to such cases that at least one of the substrates is a sintered product produced by a hot press sintering or a hot isotactic press sintering process.

In the first step of melting the flux and the second step of exiting the melted flux, a respective constant temperature should preferably be retained in the respective temperature range T1, T2. And, the respective temperature can be raised or lowered within the respective temperature range T1, T2.

The temperature range T1 in the first step is preferably at least 1,400° C. for assuredly melting the joining agent, and more preferably 1,450° C. or more for promoting the liquefaction of aluminum nitride grains at the interface between the joining agent. Meanwhile, the temperature range T1 is preferably not more than 1,650° C. in order to suppress the exit of the joining agent, because the diffusion or invasion of the joining agent into the substrates can hardly be performed if the exit of the joining agent proceed much in the first step.

The temperature range $T_2$ in the second step is preferably not lower than 1,650° C., in order to promote the exit of the joining agent, and preferably not higher than 1,800° C., in order to prevent deformation or deterioration, etc. of the aluminum nitride series substrates.

The heating time in the first step and the heating time in the second step is preferably at least 30 min but not longer than 10 hrs, respectively, but they may properly be selected.

The atmospheres in the first and second steps may be an atmosphere of an inert gas, such as, $N_2$, etc., or vacuum, so far as it is a non-oxidizing atmosphere. However, in the second step, a nitrogen atmosphere is particularly preferable, if a decomposition of the aluminum nitride is observed even in a slight amount in vacuum.

Figure 2B:
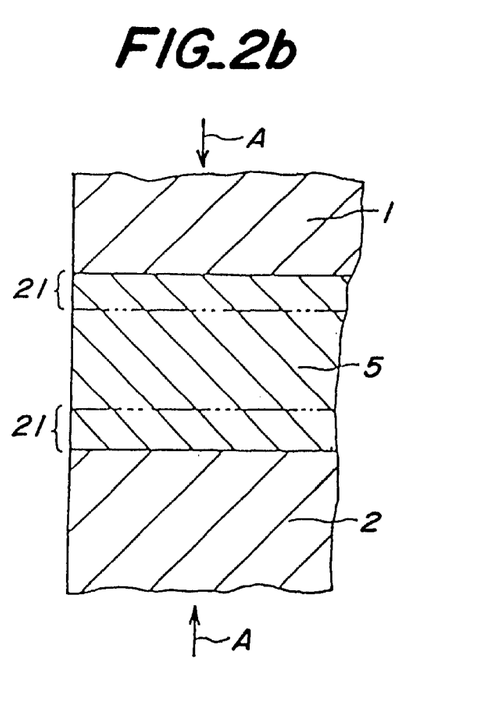
FIG. 2b is a schematic cross-sectional view of the substrates 1, 2 after the joining agent was melted between the substrates 1, 2 showing the state that the vicinity of the joining interface of the substrates 1, 2 was melted.

At the time of joining, a pressure is preferably exerted on the substrates 1, 2 as shown by an arrow A in FIG. 2 so as to further improve the joining strength. The effect of exerting a pressure appears practically from a pressure of 5 kg/cm$^2$. Upper limit of the pressure is 500 kg/cm$^2$, and exertion of a pressure exceeding the upper limit tends to easily form deformation or cracks in the substrates. Also, if the pressure is exerted at low temperatures, the substrates are cracked, sometimes. Thus, preferably the pressure is exerted at a temperature higher than the melting point of the flux.

The flux is not limited to a specific composition, but a series of composition containing yttrium is preferable, and the effect of exiting the flux is particularly significant in such a series of composition. From such a viewpoint, a flux of Y—Ca—Al—O eutectic composition is particularly preferable, and the composition of 25–45 wt % (more preferably 25–40 wt %) of CaO, 5–30 wt % (more preferably 15–30 wt %) of $Y_2O_3$ and the rest of $Al_2O_3$ is particularly preferable. Among this series of composition, 37 CaO-19 $Y_2O_3$-44 $Al_2O_3$ eutectic composition (m.p. 1,375° C.), 28 CaO-26 $Y_2O_3$-46 $Al_2O_3$ eutectic composition (m.p. 1,395° C.), and 43 CaO-5 $Y_2O_3$-52 $Al_2O_3$ composition (m.p. 1,500° C.) are particularly preferable.

As the flux, oxides of other composition series can satisfactorily be used. However, in aluminum nitride series ceramics, exition of the flux to the exterior is progressed at a temperature exceeding 1,650° C. so that the flux can hardly invade into the aluminum nitride. Thus, the melting point of the flux is preferably not more than 1,650° C., and more preferably not more than 1,600° C. In the above descriptions, the expression "melting point of the flux" used herein means a temperature at where the liquid phase begins to form.

In the joining agent, at least an aluminum nitride series ceramics is incorporated. The proportion of aluminum nitride series ceramics in the joining agent is preferably 10 wt % or more when the total amount of the joining agent is taken as 100 wt % from an aspect of facilitating the reprecipitation of the aluminum nitride series ceramics. Also from such an aspect, the proportion of the aluminum nitride series ceramics of 40 wt % or more is more preferable.

The proportion of the aluminum nitride series ceramics in the joining agent is preferably not more than 90 wt % for facilitating the melting of the aluminum nitride series ceramics. However, when the proportion of the aluminum nitride series ceramics occupies 90 wt % in the joining agent, the joining agent is considered not to melt completely. Even in such a case, the melting of the aluminum nitride series ceramics grains are proceeded to finally reprecipitate the aluminum nitride series ceramics grains in the joining agent.

In order to further progress the melting of the aluminum nitride series ceramics and to make the grain size of reprecipitated grains small and uniform so as to further improve the strength of the joining portion, the proportion of the aluminum nitride series ceramics in the joining agent is preferably not more than 80 wt %.

The flux may pose a shape of a compound or a mixture of respective components. The shape of the joining agent also is not limited specifically. For example, preferably the joining agent may pose a shape of a mixture of a powder of the flux and a powder of the aluminum nitride series ceramics, and the joining agent may also pose a shape of a calcined powder of a powder of the flux and a powder of the aluminum nitride series ceramics. Further, the joining agent may pose a shape of a foil or a thin plate of the flux and the aluminum nitride series ceramics.

The aforementioned flux of the X-Y-Z composition series is particularly preferable wherein the rare earth elements in the flux are seventeen elements of scandium, yttrium, lanthanum, cerium, praseodymium, neodymium, promethium, samarium, europium, gadolinium, terbium, dysprosium, holmium, erbium, thulium, ytterbium and lutetium. Among these elements, yttrium, lanthanum, cerium, neodium and ytterbium are more preferable owing to their especially high function of exiting the flux, yttrium and ytterbium are further preferable, and yttrium is most preferable.

The metal element X in the X-Y-Z composition series flux is preferably lithium, calcium, strontium and barium.

As the respective compounds of X, Y and Z, preferable concrete compounds are oxides or fluorides. Compounds other than oxides and fluorides may be used, however, in such a case, such compounds are preferable that may form an oxide or a fluoride at the time of melting the flux. As such compounds, carbonates, nitrates, oxalates and phosphates, etc. may be mentioned.

In the above descriptions, the fluxes of suitable compositions were listed, wherein the fluxes contain the followings.

(1) Mixtures containing an X compound, a Y compound and a Z compound. In this case, as the X compound, Y compound and Z compound, the aforementioned oxides, fluorides, carbonates, nitrates, oxalates and phosphates, etc. may be used.

(2) Compounds containing all the components X, Y and Z. For example, an oxide of the metal constituting the X compound, an oxide of the metal constituting the Y compound and an oxide of the metal constituting the Z compound are mixed to obtain a mixture, and the mixture is subjected to calcining or firing to obtain a complexed oxide or a glass which can be used as the flux.

In the flux, preferably at least one of the X component and the Y component contain an oxide or a fluoride having a vapor pressure of 0.001–1,000 Pa at 1,650–1,800° C. As such an oxide or a fluoride, $Li_2O$, $MgO$, $CaO$, $SrO$, $BaO$ and $SrF_2$ may be mentioned.

According to the present invention, a reprecipitated phase of grains of the aluminum nitride series ceramics is formed at the joining interface of the substrates. The reprecipitated phase is formed by the precipitation of aluminum nitride which was once melted in the melt of the flux. Usually, aluminum nitride grains at the joining interface of the substrates have a small average grain diameter of not more than 3 $\mu$m, and such small grains precipitated from the liquid phase are existing in a layer fashion along the joining interface of the substrates. It is considered that the fine grains are formed, because all or the substantial portions of the aluminum nitride are once melted and reprecipitated, and the aluminum nitride grains are not so progressed as yet as compared with the aluminum nitride grains in the substrates.

By virtue of such a fine structure, significant features can be obtained that the joining strength and the gastight property of the vicinity of the joining interface of the substrates can noticeably be improved and that the joining strength at the joining interface of the substrates is much higher than the strength of the other portions of the substrates. Moreover, at the joining interface, the flux is substantially not seen to remain and a noticeable third phase is not observed.

Figure 3:
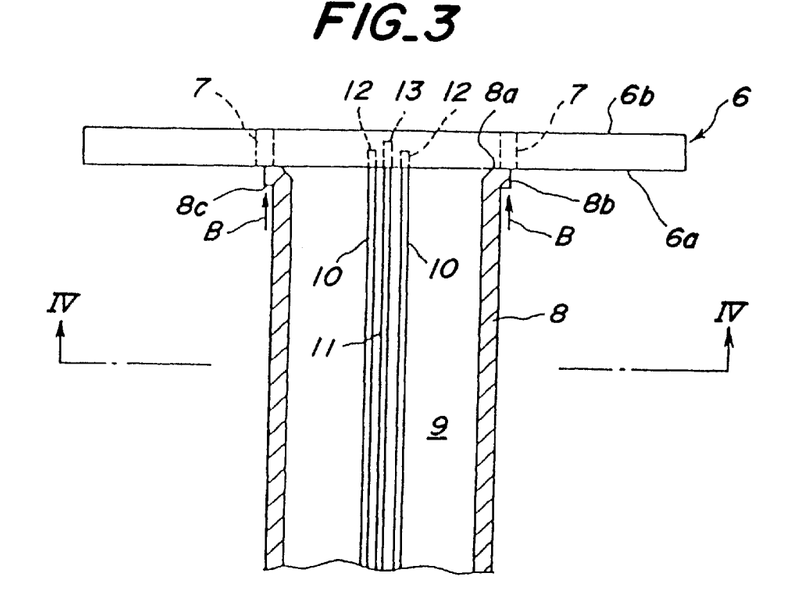
FIG. 3 is a partial cross-sectional view of a retaining structure of a susceptor 6 prepared by joining a tubular retaining member 8 and the susceptor 6.
Figure 4:
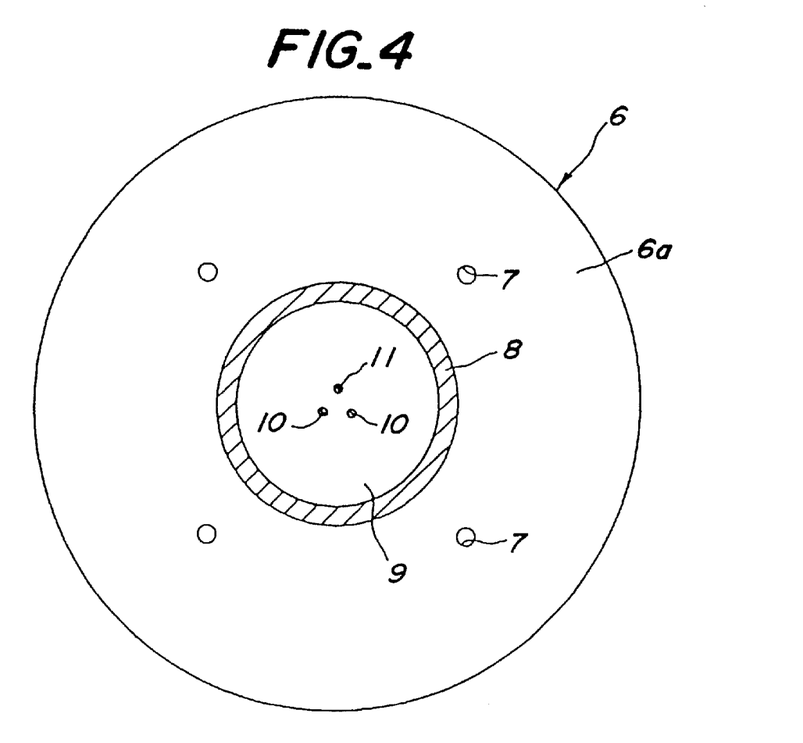
FIG. 4 is a plan view of the retaining structure of FIG. 3.

FIG. 3 is a schematic cross-sectional view of a susceptor for a semiconductor production apparatus showing a retaining structure of the susceptor, and FIG. 4 is a schematic cross-sectional view of the retaining structure of FIG. 3 along the line IV—IV. The susceptor 6 has a disc shape, for example, and a semiconductor wafer device can be provided on the surface 6b of the susceptor 6. The susceptor 6 has a rear surface 6a on which an end surface 8a of a retaining member 8 of a substantially cylindrical shape, for example, is joined. Both the susceptor 6 and the retaining member 8 are made of aluminum nitride series ceramics and are joined to each other according to the present invention. Referential numeral 7 is a penetration hole for inserting a lift pin therethrough. Preferably, a flange 8b is formed at the vicinity of the end surface 8a of the retaining member 8 so that a pressure may be applied on a surface 8c of the flange 8b as shown by an arrow B in FIG. 4, when performing the joining according to the present invention.

The function and the structure of the susceptor 6 are not specifically restricted. For example, a ceramic heater having a resistive heating member embedded in the substrate, a ceramic electrostatic chuck having electrostatic chuck electrodes embedded in the substrate, a heater having an electrostatic chuck and a resistive heating member both embedded in the substrate, and an electrode apparatus for high frequency-generation use having plasma-generating electrodes embedded in the substrate may be mentioned.

For example, in the apparatuses shown in FIGS. 3 and 4, a resistive heating member not shown is embedded in the susceptor 6, and cables 10 are connected to terminals 12 of the resistive heating member. In the susceptor 6 are embedded not shown plate-shaped electrodes functioning as the plasma-generating electrodes or the electrostatic chuck electrodes, and cables 11 are connected to terminals 13 of the electrodes.

All the cables 10, 11 and the terminals 12, 13 are accommodated in the inner space 9 of the retaining member 8 and do not contact directly to the corrosive gas or its plasma in the chamber of the semiconductor production apparatus.

In addition, according to the present invention, a dummy wafer, a shadow ring and a susceptor for providing a semiconductor wafer, a tube for generating a high frequency plasma, a dome for generating a high frequency plasma, a high frequency-permeating window, an infra-red beam light-permeating window, a shower plate and a lift pin for supporting a semiconductor wafer, and the like may be joined to other members.

DESCRIPTION OF THE PREFERRED EMBODIMENTS

Hereinafter, the present invention will be explained in more detail with reference to examples.

EXAMPLE 1

Experiments as shown in the following Tables 1 and 2 were performed to prepare joined bodies and the obtained joined bodies were evaluated on various properties.

Substrate 1 used for the joining was a sintered body obtained by sintering a powdery mixture of 5 wt % of $Y_2O_3$ powder and 95 wt % of aluminum nitride powder, and named as 95% AlN. Substrate 2 used for the joining was a sintered body obtained by sintering a powder of aluminum nitride not containing an additive, and named as 99.9% AlN. Each substrate had a size of 20 mm×20 mm×10 mm.

As a joining agent, use was made of a powdery mixture obtained by mixing given ratios of a powder of respective oxide of a given composition and a powder of aggregate aluminum nitride, as shown in the following Table 1. The respective powder was prepared as follows.

($37CaO-19Y_2O_3-44Al_2O_3$)

CaO, $Y_2O_3$ and $Al_2O_3$ of reagent grade were mixed so as to yield a composition of $37CaO-19Y_2O_3-44Al_2O_3$ in weight %, melted in air at 1,600° C., then quenched in water, and pulverized in a ball mill to a fineness of passing through a 32 $\mu$m sieve.

($28CaO-26Y_2O_3-46Al_2O_3$, $43CaO-5Y_2O_3-52Al_2O_3$)

CaO, $Y_2O_3$ and $Al_2O_3$ of reagent grade were mixed so as to yield respective composition of a given proportion by weight %, and pulverized in a pestle to a fineness of under a 32 $\mu$m sieve.

(Aggregate AlN)

A powder of aluminum nitride having a purity of 99.9% was formed to a pellet shape, and sintered in nitrogen at 1,900° C. to a relative density of 98% or more. The sintered body was disintegrated, and pulverized in a ball mill to a fineness of −32 $\mu$m sieve.

Mixing proportions of oxide powder and aggregate AlN for obtaining powdery mixtures are shown by weight % in Tables 1 and 2.

Respective surface of the substrate to be joined was processed by grinding to a surface roughness Ra of 0.2–2 $\mu$m. Respective joining agent made of a powder mixture of respective composition as shown in Tables 1 and 2 was applied on the respective surface of the substrates to be joined to a ratio of 2–200 mg/cm².

Conditions for the joining in the respective experiment were as shown in Tables 1 and 2. For exerting a pressure, an oil pressure machine was used. During the heating, a monoaxial pressure was applied in a direction vertical to the surfaces to be joined to continuously exert a given pressure as shown in Tables 1 and 2. Temperature-raising rate was selected in a range of 30–2000° C./hr. The temperature T1 at the time of melting the flux and the temperature T2 at the time of exiting the flux was varied as shown in Tables 1 and 2. Atmospheres and pressures thereof at the heat treatment are also shown in Tables 1 and 2.

Thus obtained joined bodies (bending test bars) of respective experiment numbers were evaluated on their joining strength based on a bending test as defined by Japanese Industrial Standard (JIS) R 1601 K. For performing the bending test, the joined bodies were processed at room temperature so that the joining interface becomes the center of the test bars.

At the processing, the shape of the substrates was changed. That is, according the conditions of Experiment Nos. 1–10, disc shaped substrates of a diameter $\phi$ of 50 mm×a thickness of 15 mm were joined to cylindrical shaped substrates of an outer diameter of 36 mm, an inner diameter of 28 mm and a length of 10 mm. Thus obtained joined bodies were subjected to a He leakage test. A measuremental limit of the testing machine used in this test was $1.0 \times 10^{-8}$ torr liter/sec. In Tables 1 and 2, the leakage amounts are expressed by a "torr liter/sec" unit, 1.0E-8 expresses "$1.0 \times 10^{-8}$", and 1.0E-6 expresses "$1.0 \times 10^{-6}$".

Cross-sections of the fractured bending test bars were observed by a scanning type electron microscope to analyze the state of the joining interface. The phase of the joining interface was identified by a back scattered electron image and a energy dispersion spectroscope (EDS) The results are shown in Tables 1 and 2.

TABLE 1

| Experiment No. | | 1<br>Comparative Example | 2<br>Example | 3<br>Example | 4<br>Example | 5<br>Example |
|---|---|---|---|---|---|---|
| Joined substrate | 1 | 95% AlN | 95% AlN | 95% AlN | 95% AlN | 95% AlN |
| | 2 | 99.9% AlN | 99.9% AlN | 99.9% AlN | 99.9% AlN | 99.9% AlN |
| Joining agent | 37CaO—19Y$_2$O$_3$—44Al$_2$O$_3$ | 0 | 10 | 20 | 40 | 60 |
| | 28CaO—26Y$_2$O$_3$—46Al$_2$O$_3$ | — | — | — | — | — |
| | 43CaO—5Y$_2$O$_3$—52Al$_2$O$_3$ | — | — | — | — | — |
| | AlN aggregate | 100 | 90 | 80 | 60 | 40 |
| Heat treatment | T1 | 1450° C., 2 h | 1450° C., 2 h | 1450° C., 2 h | 1450° C., 2 h | 1450° C., 2 h |
| | T2 | 1600° C., 2 h | 1600° C., 2 h | 1600° C., 2 h | 1600° C., 2 h | 1600° C., 2 h |
| | Atmosphere | N$_2$ (1.5 atm) | N$_2$ (1.5 atm) | N$_2$ (1.5 atm) | N$_2$ (1.5 atm) | N$_2$ (1.5 atm) |
| | Pressure kgf/cm$^2$ | 25 | 25 | 25 | 25 | 25 |
| Characteristics of joined body | Strength (MPa) | 5 | 220 | 350 | 350 | 350 |
| | Leakage amount | 1.0E−06 | <1.0E−8 | <1.0E−8 | <1.0E−8 | <1.0E−8 |
| | Precipitated phase | not observed | AlN | AlN | AlN | AlN |

TABLE 2

| Experiment No. | | 6<br>Example | 7<br>Example | 8<br>Comparative Example | 9<br>Example | 10<br>Example |
|---|---|---|---|---|---|---|
| Joined substrate | 1 | 95% AlN | 95% AlN | 95% AlN | 95% AlN | 95% AlN |
| | 2 | 99.9% AlN | 99.9% AlN | 99.9% AlN | 99.9% AlN | 99.9% AlN |
| Joining agent | 37CaO—19Y$_2$O$_3$—44Al$_2$O$_3$ | 80 | 90 | 100 | — | — |
| | 28CaO—26Y$_2$O$_3$—46Al$_2$O$_3$ | — | — | — | 60 | — |
| | 43CaO—5Y$_2$O$_3$—52Al$_2$O$_3$ | — | — | — | — | 60 |
| | AlN aggregate | 20 | 10 | 0 | 40 | 40 |
| Heat treatment | T1 | 1450° C., 2 h | 1450° C., 2 h | 1450° C., 2 h | 1450° C., 2 h | 1600° C., 2 h |
| | T2 | 1600° C., 2 h | 1600° C., 2 h | 1600° C., 2 h | 1600° C., 2 h | 1750° C., 2 h |
| | Atmosphere | N$_2$ (1.5 atm) | N$_2$ (1.5 atm) | N$_2$ (1.5 atm) | N$_2$ (1.5 atm) | N$_2$ (1.5 atm) |
| | Pressure kgf/cm$^2$ | 25 | 25 | 25 | 25 | 25 |
| Characteristics of joined body | Strength (MPa) | 280 | 240 | 100 | 330 | 320 |
| | Leakage amount | <1.0E−8 | <1.0E−8 | <1.0E−8 | <1.0E−8 | <1.0E−8 |
| | Precipitated phase | AlN | AlN | not observed | AlN | AlN |

In Experiment No. 1 which is a comparative example, the joining strength of the substrates was extremely low and the leakage amount was large. In Experiment Nos. 2–7, 9 and 10 which are examples of the present invention, the joining strengths of the substrates were large and the leakage amounts were small within the measuremental limit of the measuring apparatus.

In Experiment No. 8 which is a comparative example, it can be seen that a very strong joining was formed though the aggregate AlN was not used. However, it can be seen also that more strong joinings were obtained through the use of the aggregate AlN according to the present invention.

Then, the joined bodies after the leakage test were subjected to a heat cycle test of 100 cycles of heating from 50° C. to 700° C. in air to judge whether the joined bodies are capable of withstanding a thermal shock and a heat cycle. As a result, no peeling was observed nor an increase of the leakage amount was observed on all the joined bodies according to the present invention.

The joined bodies of Experiment Nos. 3, 4, 5 and 6 after the leakage test were exposed in a NF$_3$ plasma at 450° C. for 24 hrs. Subsequently the joined bodies were measured on the leakage amount in the same manner as described above to find out no increasement of the leakage amount.

Figure 5:
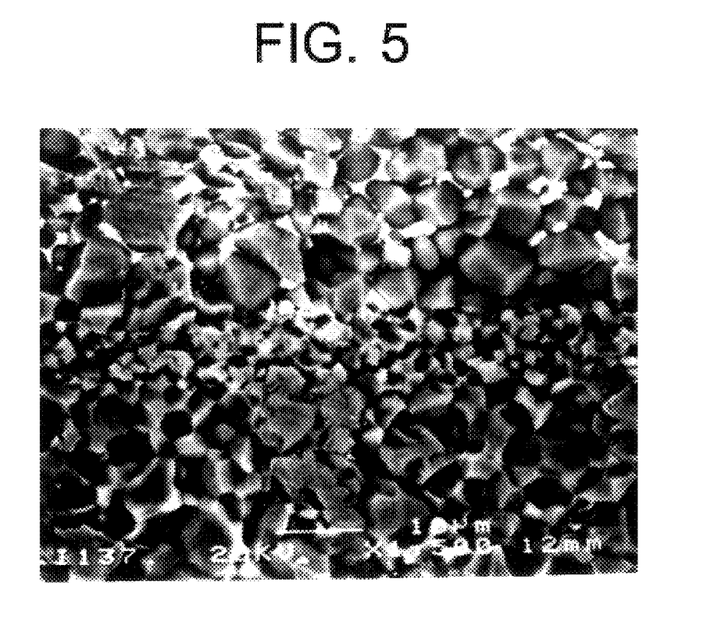
FIG. 5 is a photograph of a backscattered electron image of the ceramic structure at the vicinity of the joining interface of the joined body of Experiment No. 5.

A photograph of a ceramic structure at the vicinity of the joining interface of the joined bodies (bending test bars) of Experiment No. 5 taken by a backscattered electron microscope is shown in FIG. 5. From the upside of the photograph, 95% AlN, the joining interface and 99.9% AlN are seen in this order. In the upper 95% AlN layer, a grain boundary phase consisting mainly of yttria is seen white at the grain boundary of aluminum nitride grains which are seen black. Meanwhile, the lower 99.9% AlN layer is composed almost of aluminum nitride grains which are seen black and the grain boundary phase is not seen.

The interface layer had a thickness of about 10 μm. No crack and deteriorated layer were found at the interface layer and the its vicinity, nor a layer which was rich with Ca—Y—Al—O series material was found, showing that they are continuously connected to the ceramic structures of the upper and lower aluminum nitride layers.

The interface layer was analyzed on its composition to find out that it is composed of aluminum nitride. Though the diameter of the applied particles was 32 μm at the maximum, the aluminum nitride series grains in the interface layer had a diameter of about 2 μm. This means in short that the aluminum nitride grains in the interface layer were precipitated ones. In the interface layer an oxide was not observed, showing that the upper and lower aluminum nitride series substrates of different purities were satisfactorily joined to each other.

The joined bodies of Experiment Nos. 2, 3, 4, 6 and 7 were observed in the same manner as described above to find the similar good structure as that described above.

In the joined body of Experiment No. 1, a precipitated layer was not found. In the joined body of Experiment No. 8, oxides were completely exited from the joining interface, and the crystalline phase of 99.9% aluminum nitride and the crystalline phase of 95% aluminum nitride were found to continuously join to each other without forming an interstice therebetween.

EXAMPLE 2

In the same manner as described in Example 1, joined bodies were prepared according to the conditions as described in the following Tables 3 and 4, and tested in the same manner as in Example 1, except that the substrates made of 95% AlN were joined to each other in this Example 2. The results are shown in the following Tables 3 and 4.

Then, the joined bodies after the leakage test were subjected to a heat cycle test of 100 cycles of heating from 50° C. to 700° C. in air. As a result, no peeling was observed nor an increase of the leakage amount on all the joined bodies according to the present invention.

The joined bodies of Experiment Nos. 13–16 after the leakage test were exposed in a $NF_3$ plasma at 450° C. for 24 hrs. Subsequently the joined bodies were measured on the leakage amount in the same manner as described above to find out no increasement of the leakage amount.

Figure 6:
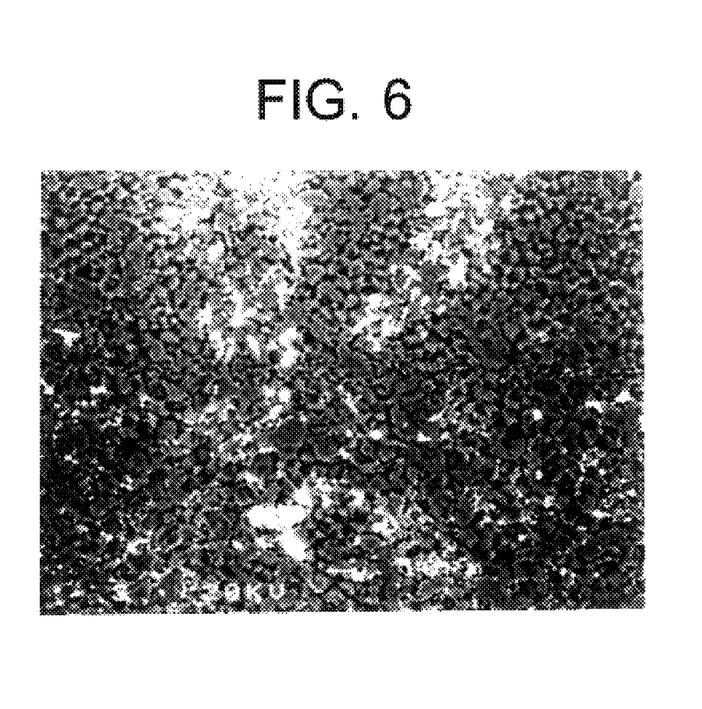
FIG. 6 is a photograph of a backscattered electron image of the ceramic structure at the vicinity of the joining interface of the joined body of Experiment No. 15.

A backscattered electron image of a ceramics structure at the vicinity of the joining interface of the joined bodies of Experiment No. 15 taken by a scanning electron microscope is shown in FIG. 6. From the upside of the photograph, 95% AlN, the joining interface and 95% AlN are seen in this

TABLE 3

| | Experiment No. | 11 Comparative Example | 12 Example | 13 Example | 14 Example | 15 Example |
|---|---|---|---|---|---|---|
| Joined substrate | 1 | 95% AlN | 95% AlN | 95% AlN | 95% AlN | 95% AlN |
| | 2 | 95% AlN | 95% AlN | 95% AlN | 95% AlN | 95% AlN |
| Joining agent | $37CaO-19Y_2O_3-44Al_2O_3$ | 0 | 10 | 20 | 40 | 60 |
| | $28CaO-26Y_2O_3-46Al_2O_3$ | — | — | — | — | — |
| | $43CaO-5Y_2O_3-52Al_2O_3$ | — | — | — | — | — |
| | AlN aggregate | 100 | 90 | 80 | 60 | 40 |
| Heat treatment | T1 | 1550° C., 2 h | 1550° C., 2 h | 1550° C., 2 h | 1550° C., 2 h | 1550° C., 2 h |
| | T2 | 1700° C., 2 h | 1700° C., 2 h | 1700° C., 2 h | 1700° C., 2 h | 1700° C., 2 h |
| | Atmosphere | $N_2$ (1.5 atm) | $N_2$ (1.5 atm) | $N_2$ (1.5 atm) | $N_2$ (1.5 atm) | $N_2$ (1.5 atm) |
| | Pressure $kgf/cm^2$ | 100 | 100 | 100 | 100 | 100 |
| Characteristics of joined body | Strength (MPa) | 10 | 250 | 330 | 330 | 330 |
| | Leakage amount | 1.0E-06 | <1.0E-8 | <1.0E-8 | <1.0E-8 | <1.0E-8 |
| | Precipitated phase | not observed | AlN | AlN | AlN | AlN |

TABLE 4

| | Experiment No. | 16 Example | 17 Example | 18 Comparative Example | 19 Example | 20 Example |
|---|---|---|---|---|---|---|
| Joined substrate | 1 | 95% AlN | 95% AlN | 95% AlN | 95% AlN | 95% AlN |
| | 2 | 95% AlN | 95% AlN | 95% AlN | 95% AlN | 95% AlN |
| Joining agent | $37CaO-19Y_2O_3-44Al_2O_3$ | 80 | 90 | 100 | — | — |
| | $28CaO-26Y_2O_3-46Al_2O_3$ | — | — | — | 60 | — |
| | $43CaO-5Y_2O_3-52Al_2O_3$ | — | — | — | — | 60 |
| | AlN aggregate | 20 | 10 | 0 | 40 | 40 |
| Heat treatment | T1 | 1550° C., 2 h | 1550° C., 2 h | 1550° C., 2 h | 1450° C., 2 h | 1600° C., 1 h |
| | T2 | 1700° C., 2 h | 1700° C., 2 h | 1700° C., 2 h | 1600° C., 1 h | 1750° C., 2 h |
| | Atmosphere | $N_2$ (1.5 atm) | $N_2$ (1.5 atm) | $N_2$ (1.5 atm) | $N_2$ (1.5 atm) | $N_2$ (1.5 atm) |
| | Pressure $kgf/cm^2$ | 100 | 100 | 100 | 100 | 100 |
| Characteristics of joined body | Strength (MPa) | 280 | 240 | 120 | 330 | 320 |
| | Leakage amount | <1.0E-8 | <1.0E-8 | <1.0E-8 | <1.0E-8 | <1.0E-8 |
| | Precipitated phase | AlN | AlN | not observed | AlN | AlN |

In Experiment No. 11 which is a comparative example, the joining strength of the substrates was extremely low and the leakage amount was large. In Experiment Nos. 12–17, 19 and 20 which are examples of the present invention, the joining strengths of the substrates were high and the leakage amounts were small within the measuremental limit of the measuring apparatus.

In Experiment No. 18 which is a comparative example, it can be seen that a very strong joining was formed though the aggregate AlN was not used. However, it can be seen also that more strong joinings were obtained through the use of the aggregate AlN according to the present invention.

order. In the upper 95% AlN layer, a grain boundary phase consisting mainly of yttria is seen white at the grain boundary of aluminum nitride crystal grains which are seen black.

The interface layer had a thickness of about 5 $\mu m$. The interface layer was analyzed on its composition to find out that it is composed of aluminum nitride. Though the diameter of the applied particles was 32 $\mu m$ at the maximum, the aluminum nitride series grains in the interface layer had a grain diameter of about 2 $\mu m$. This means in short that the aluminum nitride grains in the interface layer were precipitated ones.

The joined bodies of the Experiment Nos. 12–14, 16 and 17 were observed in the same manner as described above to find the similar good structure as that described above.

In the joined body of Experiment No. 11, a precipitated layer was not found. In the joined body of Experiment No. 18, oxides were completely exited from the joining interface, and the crystal phases of the substrates were found to continuously join to each other without forming an interstice therebetween.

EXAMPLE 3

In the same manner as in Example 1, joined bodies were prepared according to the respective condition as described in the following Tables 5 and 6, and tested in the same manner as in Example 1. The results are shown in the following Tables 5 and 6.

improved joining strength as compared with Experiment Nos. 22 and 23. In Experiment Nos. 27 and 28, substrates of 99.9% AlN were joined mutually. As seen from these results, there is a tendency that the higher the purity of the substrates is, the larger the joining strength of the substrates is. Such a tendency is particularly significant if the substrate AlN has a purity of 99% or more.

In Experiment Nos. 29 and 30, a joining agent prepared by mixing $Y_2O_3$ or $CaCO_3$ with AlN powder was used for joining substrates of 95% AlN mutually. However, the substrates could not be joined. This is considered due to unmelting of $Y_2O_3$ or $CaCO_3$ at 1,550° C. so that $Y_2O_3$ or $CaCO_3$ could not function as a flux.

Then, the joined bodies after the leakage test were subjected to a heat cycle test of 100 cycles of heating from 50° C. to 700° C. in air. As a result, no peeling was observed nor

TABLE 5

| | Experiment No. | 21 Example | 22 Example | 23 Example | 24 Example | 25 Example |
|---|---|---|---|---|---|---|
| Joined substrate | 1 | 95% AlN | 95% AlN | 95% AlN | 95% AlN | 99.9% AlN |
| | 2 | 99.8% AlN | 99.8% AlN | 99.8% AlN | 99.8% AlN | 99.8% AlN |
| Joining agent | $37CaO—19Y_2O_3—44Al_2O_3$ | 20 | 40 | 60 | 80 | 40 |
| | $28CaO—26Y_2O_3—46Al_2O_3$ | — | — | — | — | — |
| | $43CaO—5Y_2O_3—52Al_2O_3$ | — | — | — | — | — |
| | AlN aggregate | 80 | 60 | 40 | 20 | 60 |
| Heat treatment | T1 | 1550° C., 2 h | 1550° C., 2 h | 1550° C., 2 h | 1550° C., 2 h | 1550° C., 2 h |
| | T2 | 1700° C., 2 h | 1700° C., 2 h | 1700° C., 2 h | 1700° C., 2 h | 1700° C., 2 h |
| | Atmosphere | $N_2$ (1.5 atm) | $N_2$ (1.5 atm) | $N_2$ (1.5 atm) | $N_2$ (1.5 atm) | $N_2$ (1.5 atm) |
| | Pressure kgf/cm$^2$ | 50 | 50 | 50 | 50 | 50 |
| Characteristics of joined body | Strength (MPa) | 280 | 310 | 310 | 220 | 380 |
| | Leakage amount | 1.0E−8 | <1.0E−8 | <1.0E−8 | <1.0E−8 | <1.0E−8 |
| | Precipitated phase | AlN | AlN | AlN | AlN | AlN |

TABLE 6

| | Experiment No. | 26 Example | 27 Example | 28 Example | 29 Comparative Example | 30 Comparative Example |
|---|---|---|---|---|---|---|
| Joined substrate | 1 | 99.9% AlN | 99.9% AlN | 99.9% AlN | 95% AlN | 95% AlN |
| | 2 | 99.8% AlN | 99.9% AlN | 99.9% AlN | 95% AlN | 95% AlN |
| Joining agent | $37CaO—19Y_2O_3—44Al_2O_3$ | 60 | 40 | 60 | $Y_2O_3$ 60 | $CaCO_3$ 60 |
| | $28CaO—26Y_2O_3—46Al_2O_3$ | — | — | — | — | — |
| | $43CaO—5Y_2O_3—52Al_2O_3$ | — | — | — | — | — |
| | AlN aggregate | 40 | 60 | 40 | 40 | 40 |
| Heat treatment | T1 | 1550° C., 2 h | 1400° C., 0.5 h | 1400° C., 0.5 h | 1550° C., 2 h | 1550° C., 2 h |
| | T2 | 1700° C., 2 h | 1550° C., 0.5 h | 1550° C., 0.5 h | 1700° C., 2 h | 1700° C., 2 h |
| | Atmosphere | $N_2$ (1.5 atm) | $N_2$ (1.5 atm) | $N_2$ (1.5 atm) | $N_2$ (1.5 atm) | $N_2$ (1.5 atm) |
| | Pressure kgf/cm$^2$ | 50 | 50 | 50 | 50 | 50 |
| Characteristics of joined body | Strength (MPa) | 390 | 440 | 420 | 0 | 0 |
| | Leakage amount | <1.0E−8 | <1.0E−8 | <1.0E−8 | — | — |
| | Precipitated phase | AlN | AlN | AlN | — | — |

In Experiment Nos. 21–24, substrates of 99% AlN and 99.8% AlN (added with 0.15% of yttria) were joined to each other. All the obtained joined bodies of Experiment Nos. 21–24 had superior joining strength and small leakage amount and the precipitated phase was AlN phase. From the results, it was seen that the joining strength can be improved most by using an AlN content of 40–60 wt % in the joining agent.

In Experiment Nos. 25 and 26, substrates of 99.9% AlN and 99.8% AlN were joined to each other to obtain a more an increase of the leakage amount on all the joined bodies according to the present invention.

The joined bodies of Experiment Nos. 21–28 after the leakage test were exposed in a $NF_3$ plasma at 450° C. for 24 hrs. Subsequently the joined bodies were measured on the leakage amount in the same manner as described above to find out no increasement of the leakage amount.

Figure 7:
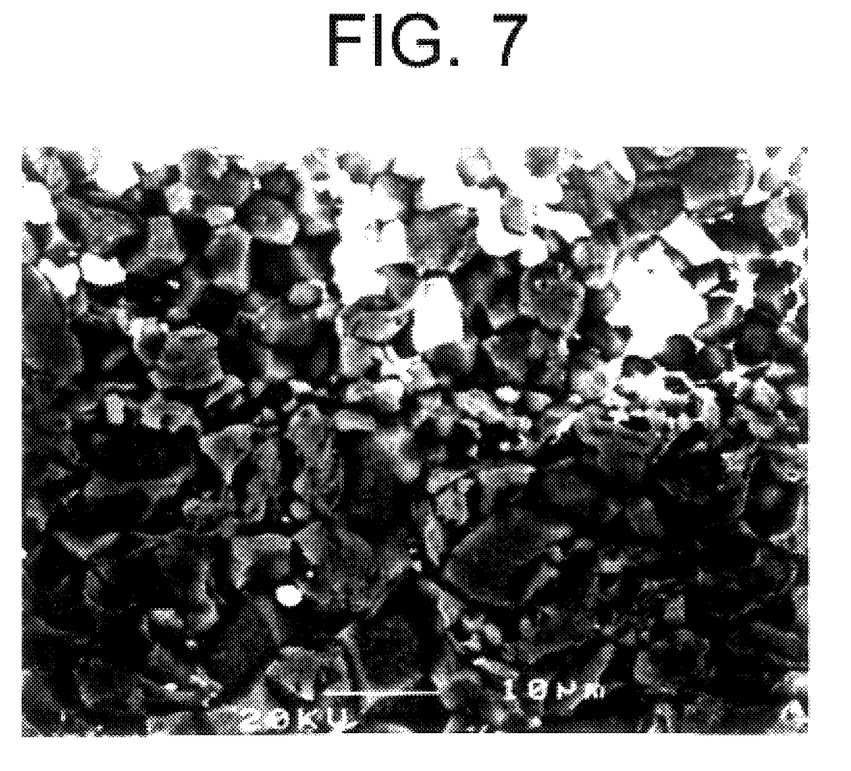
FIG. 7 is a photograph of a backscattered electron image of the ceramic structure at the vicinity of the joining interface of the joined body of Experiment No. 23.

A backscattered electron image of a ceramics structure at the vicinity of the joining interface of the joined bodies of Experiment No. 23 taken by a scanning electron microscope is shown in FIG. 7. From the upside of the photograph, 95% AlN, the joining interface phase and 99.8% AlN are seen in this order. The interface layer had a thickness of about 4 μm.

The interface layer was analyzed on its composition to find out that it is composed of aluminum nitride. Though the particle diameter of the applied particles was 32 μm at the maximum, the aluminum nitride series grains in the interface layer had a diameter of about 2 μm. This means in short that the aluminum nitride grains in the interface layer were reprecipitated ones. Oxides were still not found at the interface layer.

EXAMPLE 4

Preparation of a heater having a protective tube.

Joined bodies as shown in FIGS. 3 and 4 were prepared. Concretely explaining, it was attempted to join the disc shaped susceptor 6 made of aluminum nitride having an embedded molybdenum heater coil and high frequency plasma electrodes made of molybdenum mesh to the retaining member 8 made of an aluminum nitride pipe. The retaining member 8 had a size of an outer diameter of 60 mm, an inner diameter of 52 mm and a length of 210 mm. The retaining member 8 was prepared by sintering AlN of a purity of 95% at atmospheric pressure.

As the furnace f or performing the joining, a hot press furnace constructed from carbon furnace materials was used. Heating was effected in nitrogen atmosphere at a pressure of 1.5 atm. The susceptor 6 and the retaining member 8 were brought into contact to each other, heated at a temperature-elevating rate of 100–1,000° C./hr, held at 1,550° C. for 1 hr, subsequently held at 1,700° C. for 2 hrs. After held at 1,700° C. for 2 hrs, they were left cool in the furnace to room temperature. During the heating of the assembly at temperatures of not less than 1,300° C., a pressure of 60 kgf/cm$^2$ was continuously exerted by an oil pressure machine to the joining interface of the assembly.

The thus obtained joined bodies were taken out from the furnace, then tested by a leakage test in the same manner as in Example 1 to find out that the leakage amounts were less than $1.0 \times 10^{-8}$ torr liter/sec.

Then, to the molybdenum heater coil and the molybdenum mesh were attached lead wires of electrodes. The heater coils were heated by applying an electric current therethrough and subjected to 30 heat cycles of temperature elevating and cooling at a rate of about 25° C./min to find out no crack or deformation of the susceptors. After the heat cycle test, the susceptors were again tested for helium leakage test to find out that the leakage amounts of the susceptors were maintained to less than $1.0 \times 10^{-8}$ torr liter/sec.

EXAMPLE 5

In the same manner as in Example 1, joined bodies were prepared according to the respective condition as described in the following Tables 7 and 8, and tested in the same manner as in Example 1, except that the kinds of the compounds of X, Y and Z, the proportion (mol %) of respective compound in the flux and the weight propertion (parts by weight) of the flux to the aluminum nitride aggregate were changed as shown in Tables 7 and 8. The results are shown in the following Tables 7 and 8.

TABLE 7

| Experiment No. | | 31 Example | 32 Example | 33 Example | 34 Example | 35 Example |
|---|---|---|---|---|---|---|
| Joined | 1 | 99.9% AlN | 95% AlN | 95% AlN | 95% AlN | 95% AlN |
| substrate | 2 | 99.9% AlN | 99.9% AlN | 95% AlN | 99.9% AlN | 99.9% AlN |
| Composition of flux (mol %) | X | | Li$_2$O:49 | | BaO 56 | CaO 56 |
| | Y | | Y$_2$O$_3$:26 | | Y$_2$O$_3$ 7 | La$_2$O$_3$ 7 |
| | Z | | Al$_2$O$_3$:25 | | Al$_2$O$_3$ 37 | Al$_2$O$_3$ 37 |
| Amount of flux (weight parts) | | | 60 | | 50 | 50 |
| Amount of aggregate (weight parts) | | | 40 | | 50 | 50 |
| Heat treatment | T1 | 1500° C., 2 h | 1550° C., 2 h | 1550° C., 2 h | 1500° C., 2 h | 1550° C., 2 h |
| | T2 | 1620° C., 1 h | 1650° C., 2 h | 1650° C., 2 h | 1650° C., 2 h | 1650° C., 1 h |
| | Atmosphere Pressure | N$_2$ (1.8 atm) | N$_2$ (2.3 atm) | N$_2$ (2.3 atm) 40 kgf/cm$^2$ | N$_2$ (1.8 atm) | N$_2$ (2.3 atm) |
| Characteristics of joined body | Strength (MPa) | 350 | 210 | 130 | 290 | 220 |
| | Leakage amount | 1.0E−08 | <1.0E−8 | <1.0E−8 | <1.0E−8 | <1.0E−8 |
| | Precipitated phase | AlN | AlN | AlN | AlN | AlN |

TABLE 8

| Experiment No. | | 36 Example | 37 Example | 38 Example | 39 Example |
|---|---|---|---|---|---|
| Joined substrate | 1 | 95% AlN | 95% AlN | 95% AlN | 95% AlN |
| | 2 | 99.9% AlN | 99.9% AlN | 99.9% AlN | 99.9% AlN |
| Composition of flux (mol %) | X | $CaF_2$ 56 | CaO 56 | CaO 54 | BaO 56 |
| | Y | $Y_2O_3$ 7 | $Y_2F_6$ 7 | $Y_2O_3$ 10 | $La_2O_3$ 7 |
| | Z | $Al_2O_3$ 37 | $Al_2O_3$ 36 | $Al_2F_6$ 36 | $Al_2O_3$ 20 $Al_2F_6$ 17 |
| Amount of flux (weight parts) | | 50 | 40 | | 40 |
| Amount of aggregate (weight parts) | | 50 | 60 | | 60 |
| Heat treatment | T1 | 1550° C., 2 h | 1550° C., 1 h | 1550° C., 1 h | 1550° C., 1 h |
| | T2 | 1650° C., 1 h | 1700° C., 2 h | 1700° C., 2 h | 1700° C., 2 h |
| | Atmosphere | $N_2$ (2.3 atm) | $N_2$ (1.5 atm) | $N_2$ (1.5 atm) | $N_2$ (1.5 atm) |
| | Pressure | | 40 kgf/cm$^2$ | | |
| Characteristics of joined body | Strength (MPa) | 170 | 130 | 150 | 250 |
| | Leakage amount | 1.0E−08 | <1.0E−8 | <1.0E−8 | <1.0E−8 |
| | Precipitated phase | AlN | AlN | AlN | AlN |

All the obtained joined bodies of Experiment Nos. 31–39 had superior joining strength, small leakage amount and the precipitated AlN phase. Thus, in combinations of (Li, Ba, Ca)—(Y, La)—Al series metal elements, satisfactory results were obtained by using an oxide or a fluoride.

Then, the joined bodies after the leakage test were subjected to a heat cycle test of 100 cycles of heating from 50° C. to 700° C. in air. As a result, no peeling nor an increase of the leakage amount was observed on all the joined bodies of the experiments according to the present invention.

The joined bodies of Experiment Nos. 31–39 after the leakage test were exposed in a $NF_3$ plasma at 450° C. for 24 hrs. Subsequently the joined bodies were measured on the leakage amount in the same manner as described above to find out no increasement of the leakage amount.

As explained in detail in the foregoing descriptions, according to the present invention, a novel method of joining substrates made of aluminum nitride series ceramics mutually can be provided in the substantial absence of a remaining intervening phase other than aluminum nitride series ceramics at the joining interface of the substrates. In addition, the substrates can be joined firmly at a relatively low temperature.

Although the present invention has been explained with reference to specific examples and numeral values, it is of course apparent to those skilled in the art that various changes and modifications thereof are possible without departing from the broad spirit and aspect of the present invention as defined in the appended claims.

What is claimed is:

1. A joined body comprising plural substrates of aluminum nitride ceramics, and a reprecipitated phase consisting essentially of aluminum nitride ceramics without the presence of an intervening third phase other than the aluminum nitride phase, reprecipitated from a liquid phase containing a flux at a joining interface of the substrates, where the reprecipitated aluminum nitride ceramics phase does not have remaining flux.

2. The joined body as defined in claim 1, wherein the aluminum nitride ceramics grains existing in the reprecipitated phase have an average grain diameter of not less than 1.0 μm but not more than 3.0 μm.

3. A method of producing a joined body of plural substrates of aluminum nitride ceramics, comprising providing a joining agent comprising at least an aluminum nitride ceramics and a flux between the substrates, heating the flux and the aluminum nitride ceramics to melt them to liquid phase by eutectic melting, pressing the substrates together thereby expelling the flux from within the trains of aluminum nitride and from the joining interface between the substrates, and forming a reprecipitated phase composed of aluminum nitride ceramics by reprecipitation at the joining interface of the substrates.

4. The method as defined in claim 3, wherein the joining agent is heated to a temperature range T1 which is not lower than the melting point of the flux, subsequently heated to a temperature range T2 which is higher than the temperature range T1 until the flux components are exited from the joining interface, and then the reprecipitated phase is formed by precipitation.

5. The method defined in claim 3, wherein each of the substrates is a sintered product.

6. The method as defined in claim 3, wherein a pressure is applied to the substrates of not less than 5 kg/cm$^2$ to further improve the joining strength.

7. A method of producing a joined body of plural substrates composed of aluminum nitride ceramics, comprising providing a joining agent containing at least an aluminum nitride series ceramics and a flux between the substrates, heating the joining agent to a temperature range T1 which is not lower than the melting point of the flux, subsequently heating the joining agent to a temperature range T2 which is higher than the temperature range T1 until components of the flux are exited from the joining interface, and then forming the reprecipitated phase by precipitation.

8. The method as defined in claim 7, wherein the flux has a melting point of not lower than 1,300° C. but not higher than 1,500° C.

9. The method as defined in claim 8, wherein the flux has a composition of 25–45 wt % of CaO, 5–30 wt % of $Y_2O_3$ and the remainder of $Al_2O_3$, the joining agent is heated to a temperature range of 1,400–1,650° C., and subsequently the joining agent is heated to a temperature range of 1,650–1,800° C. until the components of the flux are exited from the joining interface.

10. The method as defined in claim 7, wherein the flux has a composition of 25–45 wt % of CaO, 5–30 wt % of $Y_2O_3$ and the remainder of $Al_2O_3$, and the content of the aluminum nitride ceramics in the joining agent is not less than 10 wt % but not more than 90 wt %.

11. The method as defined in claim 7, wherein the flux has an X-Y-Z composition, wherein X is a compound of at least one metal selected from the group consisting of alkali metal elements and alkaline earth metal elements, Y is a compound of a rare earth element, and Z is a compound of aluminum, the content of the metal element constituting the compound X in the total metal elements constituting the flux is in a range of 25–50 mol %, the content of the rare earth element constituting the compound Y in the total metal elements constituting the flux is in a range of 5–30 mol %, and the remainder of the total metal elements constituting the flux is aluminum.

12. The method as defined in claim 11, wherein, when heating the joining agent to a temperature range T1 of not lower than the melting point of the flux, an eutectic melt of the flux and the aluminum nitride ceramics contains at least one of an oxide and a fluoride of the metal constituting the compound X, at least one of an oxide and a fluoride of the rare earth element, and at least one of an oxide and a fluoride of aluminum.

13. The method as defined in claim 11, wherein, the content of the aluminum nitride ceramics in the joining agent is not less than 10 wt % but not more than 90 wt %.

14. A joining agent for joining plural substrates composed of aluminum nitride ceramics, comprising an aluminum nitride ceramic and a flux of a composition of 25–45 wt % of CaO, 5–30 wt % of $Y_2O_3$ and the remainder of $Al_2O_3$, and the content of the aluminum nitride ceramic in the joining agent being not less than 10 wt % but not more than 90 wt %.

15. A joining agent for joining plural substrates composed of aluminum nitride ceramics, comprising an aluminum nitride ceramics and a flux, the flux having an X-Y-Z composition, and the content of the aluminum nitride ceramics in the joining agent being not less than 10 wt % but not more than 90 wt %, wherein X is a compound of at least one metal selected from the group consisting of alkali metal elements and alkaline earth metal elements, Y is a compound of a rare earth element, and Z is a compound of aluminum, the content of the metal element constituting the compound X in the total metal elements the constituting the flux is in a range of 25–50 mol %, the content of the rare earth element constituting the compound Y in the total metal elements constituting the flux is in a range of 5–30 mol %, and the remainder of the total metal elements constituting the flux is aluminum.

16. The joining agent as defined in claim 15, wherein at least one of said X and Y contains an oxide or a fluoride having a vapor pressure of 0.001–1,000 Pa at 1,650–1,800° C.

17. A joined body comprising plural substrates of aluminum nitride ceramics, and a reprecipitated phase consisting essentially of aluminum nitride ceramics and having mechanical strength of not less than 220 MPa, reprecipitated from a liquid phase containing a flux at a joining interface of the substrates, where the reprecipitated aluminum nitride ceramics phase does not have remaining flux.

* * * * *